United States Patent
Shiota

(10) Patent No.: US 6,977,947 B1
(45) Date of Patent: Dec. 20, 2005

(54) FRAME-RELAY FRAME TRANSMISSION CIRCUIT

(75) Inventor: Yoshiaki Shiota, Tokyo (JP)

(73) Assignee: NEC Corporation, (JP)

(*) Notice: Subject to any disclaimer, the term of this patent is extended or adjusted under 35 U.S.C. 154(b) by 0 days.

(21) Appl. No.: 09/220,434

(22) Filed: Dec. 24, 1998

(30) Foreign Application Priority Data

Dec. 26, 1997 (JP) .................................. 9-359899

(51) Int. Cl.⁷ ............................................... H04J 3/24
(52) U.S. Cl. ............. 370/474; 370/395.52; 370/395.53
(58) Field of Search ................................ 370/355, 356, 370/395, 466, 467, 470, 474, 465, 395.1, 370/398, 399, 310, 428, 429, 395.52, 395.53, 370/395.6, 395.61, 395.63, 395.64

(56) References Cited

U.S. PATENT DOCUMENTS

| | | | |
|---|---|---|---|
| 5,278,828 A * | 1/1994 | Chao ........................... | 370/394 |
| 5,490,140 A | 2/1996 | Abensour et al. | |
| 5,602,853 A | 2/1997 | Ben-Michael et al. | |
| 5,768,274 A * | 6/1998 | Murakami et al. ........... | 370/395 |
| 6,052,383 A * | 4/2000 | Stoner et al. ............... | 370/466 |
| 6,128,300 A * | 10/2000 | Horton ........................ | 370/395 |
| 6,144,669 A * | 11/2000 | Williams et al. ............ | 370/401 |
| 6,185,635 B1 * | 2/2001 | O'Loughlin et al. .......... | 710/31 |
| 6,205,152 B1 * | 3/2001 | Von Ahnen et al. ........ | 370/419 |
| 6,301,259 B1 * | 10/2001 | Nakabayashi ............... | 370/413 |
| 6,324,625 B1 * | 11/2001 | Singer et al. ............... | 711/154 |

FOREIGN PATENT DOCUMENTS

| | | |
|---|---|---|
| CN | 2120558 | 2/1999 |
| JP | 6276215 | 9/1994 |
| JP | 6350631 | 12/1994 |
| JP | 7202903 | 8/1995 |
| JP | 102 762 19 | 10/1996 |
| KR | 9615603 | 11/1996 |

OTHER PUBLICATIONS

Finland Office Action issued Nov. 9, 2004.

* cited by examiner

*Primary Examiner*—Duc Ho
*Assistant Examiner*—Thien Tran
(74) *Attorney, Agent, or Firm*—Dickstein, Shapiro, Morin & Oshinsky, LLP.

(57) ABSTRACT

This invention is intended to eliminate an operation to copy the frame-relay frame, which was written in a memory through a frame transmission processing device, into another area excluding a memory table for the frame data, when a multiprotocol of a frame-relay frame is converted into a multiprotocol of the AAL5 frame.

The frame-relay frame transmission circuit performs retrieval in the connection table and obtains the shift size by which the frame is to be shifted from the top address of a frame buffer. Then, the circuit searches the frame buffer, and transmits the frame buffer address with the shift information to a processor bus interface. The processor bus interface transmits the received frame to the address in the DMA transmission process.

11 Claims, 4 Drawing Sheets n: NUMBER OF MAXIMUM CONNECTIONS

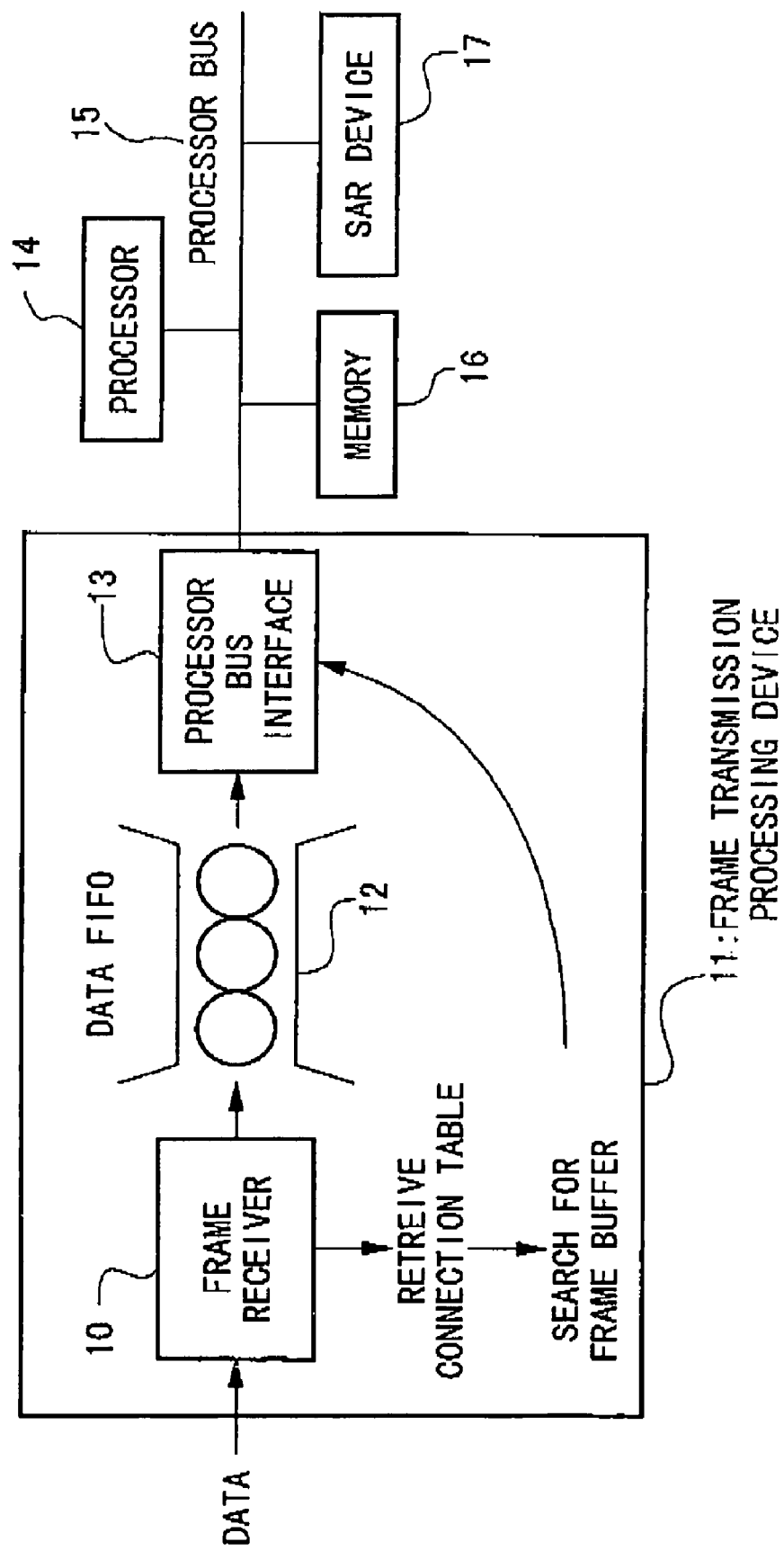

FRAME-RELAY FRAME TRANSMISSION CIRCUIT

FIELD OF THE INVENTION

The present invention relates to a frame-relay frame transmission circuit using a DMA transmission process, and in particular, to a frame-relay frame transmission circuit for converting a frame-relay frame into an AAL5 (ATM Adaptation Layer type 5) frame.

This application is based on Japanese Patent Application No. Hei 9-359899, the contents of which are incorporated herein by reference.

BACKGROUND ART

FIG. 1 shows a system for converting a received frame-relay frame into an ATM cell using a device performing a conventional direct memory access (DMA).

A processor 105 performs a process through a processor bus 106 according to an instruction from software. When receiving a frame-relay frame through a channel, a frame receiver 101 in a frame transmission processing device 102 searches for (hunts) a frame buffer. A data FIFO block 103 temporarily stores frame data. A processor bus interface 104 transmits the frame to the searched frame buffer in a memory 107 through the DMA.

A segmentation and reassembly (SAR) device 108 receives frame cell conversion information according to an instruction from the processor, and performs segmentation of the frame into an ATM cell.

The memory 107 is accessed by the processor 105 and the frame transmission processing device 102, and stores the frame cell conversion information 109 for conversion of the frame into an ATM cell and data 110 of the frame in the frame buffer as shown in FIG. 2.

The operation of the system will be explained. The processor 105 prepares an available frame buffer area in the frame transmission processing device 102. When starting to receive the frame receiver 101, the frame receiver 101 searched for the frame buffer and notifies the processor bus interface 104 of the top address of the frame buffer. The processor bus interface 104 transmits the received frame from the data FIFO block 103 to the memory 107 through the DMA according to the received address. At that time, the transmitted frame is stored in the frame transmission processing device 102. After completion of the transmission, an interrupt notification is sent to the processor 105.

By the software detecting the interrupt, the transmitted frame information is read from the frame transmission processing device 102. A multiprotocol section for the frame-relay frame which is written in the memory 107 is converted into a multiprotocol for ATM Adaptation Layer 5 (AAL5). While an area of an identifier for making a packet (capsuling) and transmitting the multiprotocol is assigned at the top of user data in the frame-relay frame and at the top of the AAL5 frame, the size of the area of the AAL5 frame is greater than the other kinds of protocols. To perform conversion between such protocols, the frame-relay frame is copied into a free area, which is not occupied by the frame data 11, in the memory 107 by the software, and the conversion of the protocols is performed. After completion of the conversion, the processor transfers the frame cell conversion information to the SAR device 108, which converts the frame into the AAL5 frame and produces an ATM cell.

However, there is the problem that the frame transmission processing device 102 may write the frame data from the top of the searched frame buffer. When the area for the multiprotocol of the AAL5 frame is greater than that of the frame-relay frame, the frame-relay frame must be copied into a free area, which is not occupied by the frame data 11, in the memory 107 by software for performing conversion between such protocols, increasing the overhead caused by the conversion process.

This is because the conventional frame transmission processing device 102 is not designed according to concepts in which the frame is lengthened due to the conversion of the transmitted frame data and in which the top of the frame is converted.

SUMMARY OF THE INVENTION

It is therefore an object of the present invention to provide a frame-relay frame transmission circuit which can reduce overhead caused by a conversion process.

In order to accomplish the above object, in a frame-relay frame transmission circuit of the present invention, when a received frame-relay frame is written in a memory, the frame is written from an address shifted from the top of a frame buffer. The shift size is determined for each connection.

Further, a frame-relay frame transmission circuit of the present invention for reassembling a frame-relay frame into an Asynchronous Transfer Mode (ATM) cell comprises: a processor for determining a shift size for each connection, the shift size by which the frame is to be shifted from the top address of a frame buffer; a frame receiver for receiving the frame through the connection; a memory for storing the received frame in a frame buffer from an address shifted from the top of a frame buffer by the shift size; and a segmentation and reassembling device for reassembling the frame into the ATM cell.

The processor writes a set of data link connection identifiers (DLCI) and the shift size into a connection table, and retrieves the shift size in the connection table using the DLCI as a key. The frame received by the frame receiver is transmitted to the memory through direct memory access.

Furthermore, a method of the present invention for reassembling a frame-relay frame into an Asynchronous Transfer Mode (ATM) cell comprises the steps of: determining a shift size for each connection by which the frame is to be shifted from the top address of a frame buffer in a memory; receiving the frame and writing the frame from an address shifted from the top address of the frame buffer by the shift size; and reassembling the frame into an ATM cell.

The method of the present invention further comprises the steps of: writing a set of a data link connection identifier (DLCI) and the shift size into a connection table, and retrieving the shift size in the connection table using the DLCI as a key. The received frame is transmitted to the memory through direct memory access.

The advantage of such a circuit is that, even when a multiprotocol of a frame-relay frame is converted into a multiprotocol of the AAL5 frame, it is unnecessary to copy the frame-relay frame, which was written in a memory through a frame transmission processing device, into another area excluding a memory table for the frame data.

This is because the frame is written from a position which is shifted from the top of a searched frame buffer when the frame transmission processing device 11 writes the frame into the memory.

The second advantage is that the waste of resources due to shifting of all frames can be avoided because a frame which does not need to be shifted is not shifted.

Additional objects and advantages of the present invention will be apparent from the following detailed description of a preferred embodiment thereof, which is best understood with reference to the accompanying drawings.

BRIEF DESCRIPTION OF THE DRAWINGS

FIG. 3 is a schematic diagram showing a frame transmission processing device and peripheral devices of the present invention.

DETAILED DESCRIPTION OF THE PREFERRED EMBODIMENTS

Referring to figures, the best mode of a frame-relay frame transmission circuit according to an embodiment of the present invention will be explained.

Figure 1:
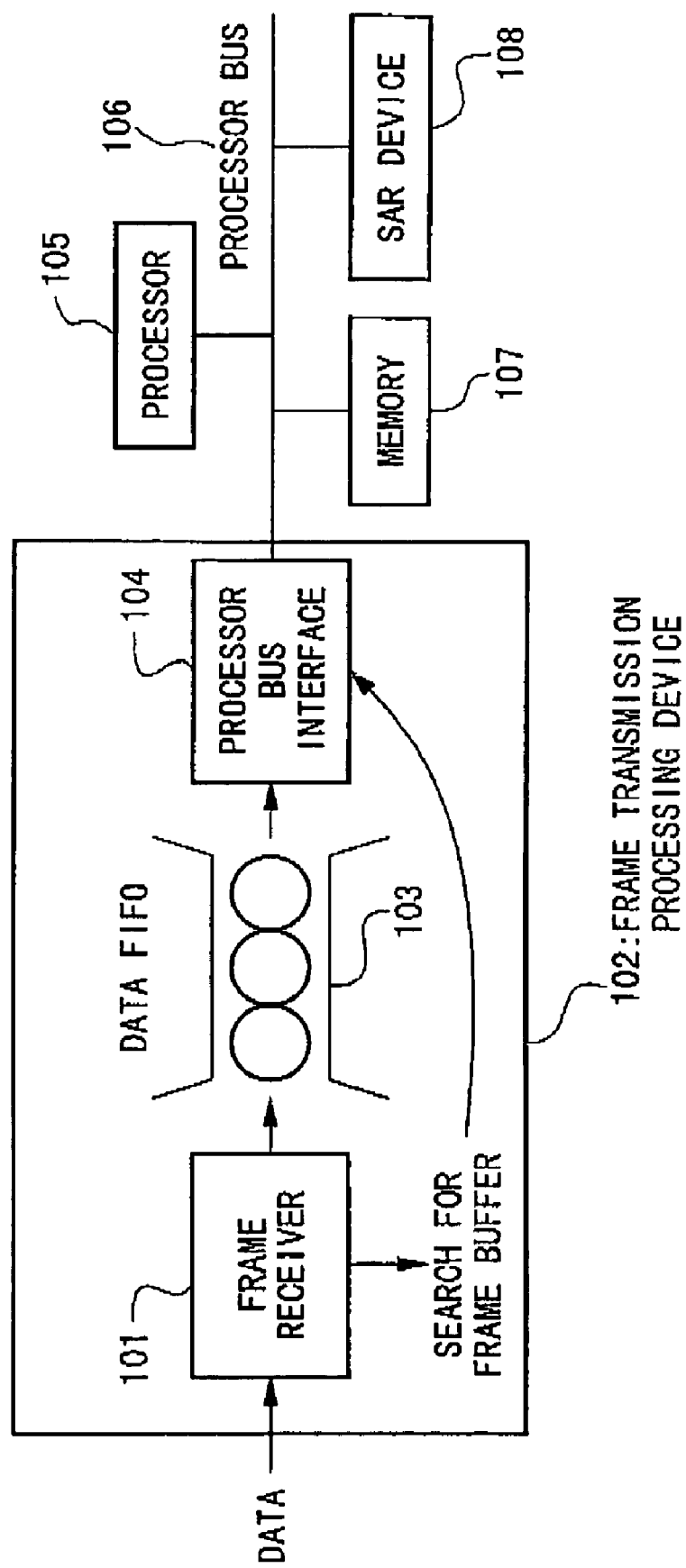
FIG. 1 is a schematic diagram showing a conventional frame transmission processing device and peripheral devices.
Figure 2:
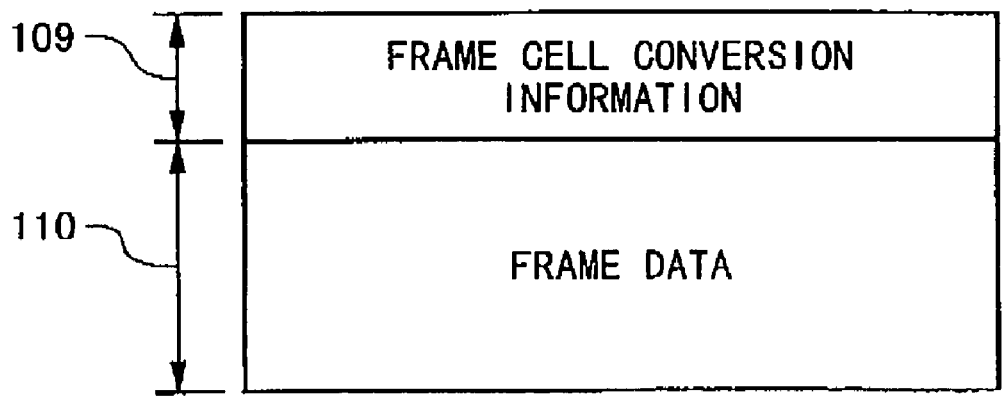
FIG. 2 is a diagram showing a memory in the conventional device of FIG. 1.
Figure 4:
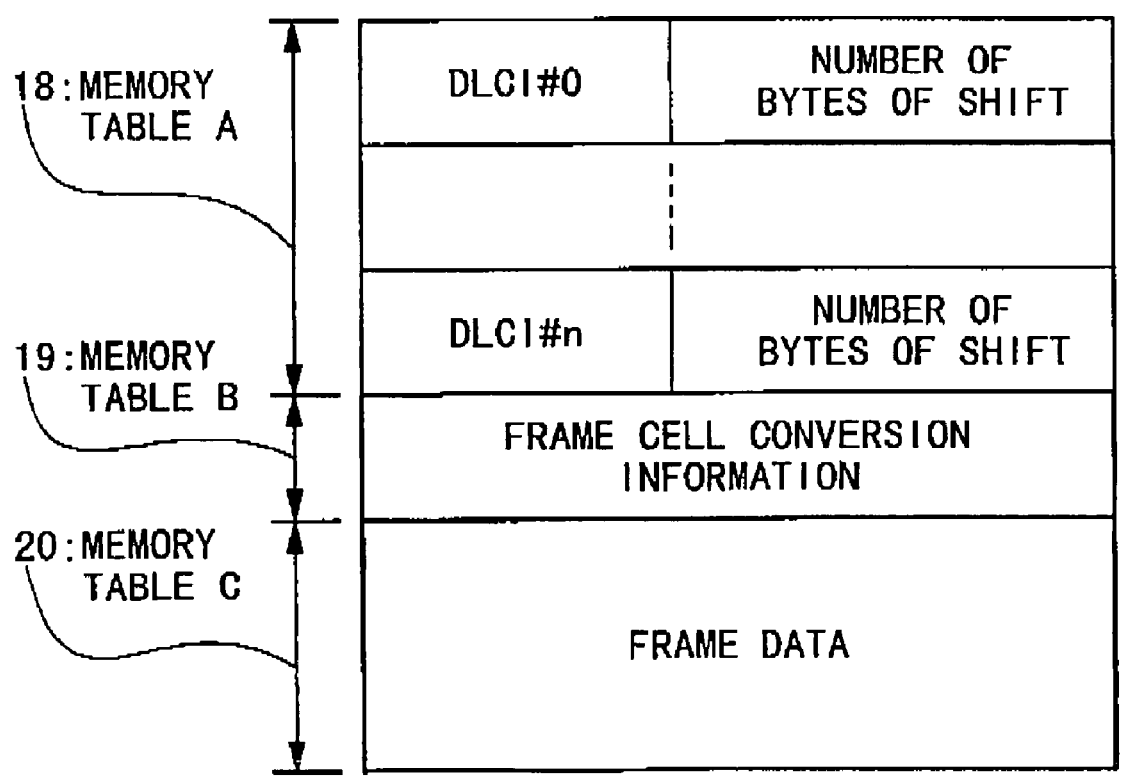
FIG. 4 is a diagram showing a memory in the device of FIG. 3.
Figure 5:
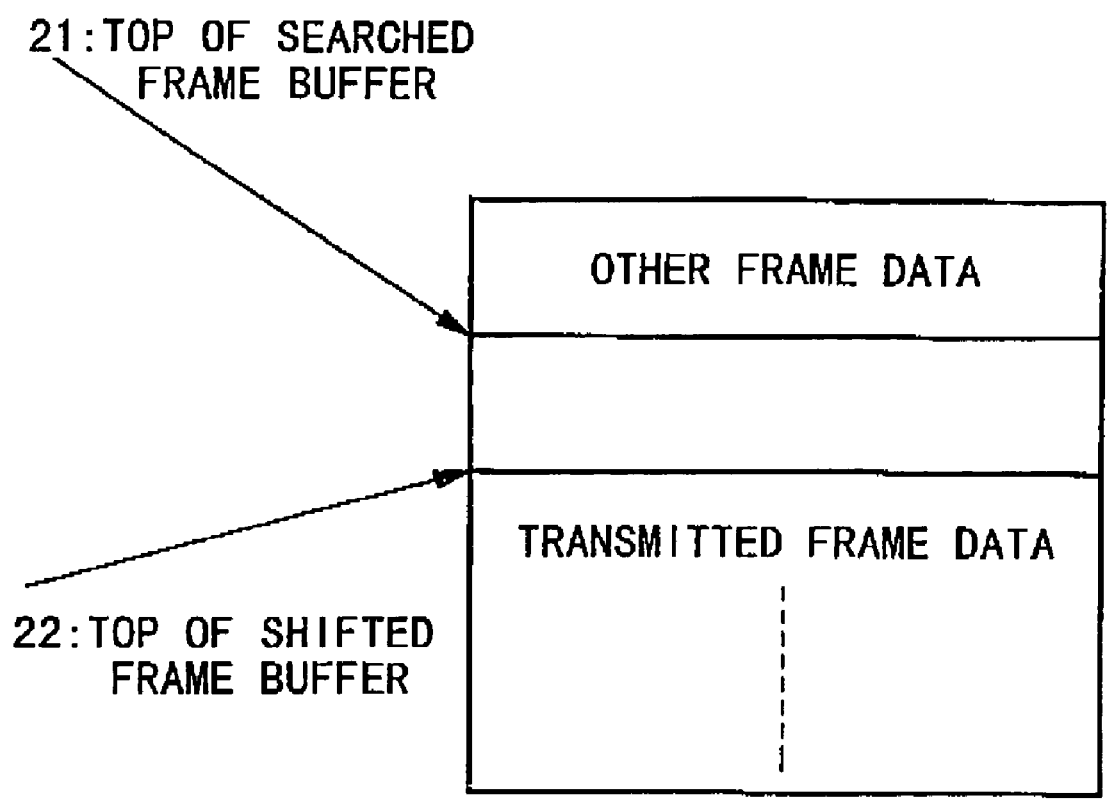
FIG. 5 is a diagram showing a frame which is written from a position shifted from the top of a frame buffer.

FIG. 3 is a schematic diagram showing a system of the present invention, FIG. 4 shows a memory 16 in detail, and FIG. 5 shows an example of a received frame which is shifted and written from the top of a searched (hunted) frame buffer.

According to an instruction from a software, a processor 14 writes a set of a data link connection identifier (DLCI) and shift information for each reception channel to a memory table A18 which is a connection table. The DLCI is a connection identifier for frame-relay frame, and the shift information indicates how many bytes the received frame is to be shifted by from the top of the frame buffer. The size of the whole frame buffer and the start address are indicated to a frame transmission processing device 11.

When receiving the top portion of the frame-relay frame from the channel, a frame receiver 10 in the frame transmission processing device 11 performs retrieval in the memory table A18 using the DLCI at the top portion as a key, and obtains the number of the bytes of the shift. The frame receiver 10 searches for (hunts) a frame buffer 21 and instructs a processor bus interface 13 to transmit the frame. An address indicated in the instruction is a shifted top address 22 of the frame buffer which was shifted by a given number of bytes.

According to the indicated top address, the processor bus interface 13 receives the frame from a data FIFO block 12 and transmits it to a memory 16 through a DMA process.

The transmitted frame information is stored in the frame transmission processing device 11. After the transmission is completed, the processor 14 transmits an interrupt notification to the processor 14. Through the software detecting the interrupt, the transmitted frame information is read from the frame transmission processing device 11. A multiprotocol of the frame-relay frame written in the memory 107 is converted into an AAL5 multiprotocol. After conversion, the processor transfers frame cell conversion information in the memory table 19 to a SAR device 17, which converts (reassembles) the frame into the AAL5 frame and produces an ATM cell.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A frame-relay frame processing device for reassembling a frame-relay frame into an Asynchronous Transfer Mode (ATM) cell, wherein said device receives a frame-relay frame and writes said frame to a memory location shifted from a top of the next available memory location in a frame buffer.

2. A frame-relay frame processing device according to claim 1, wherein a size of the shift from the top of the next available memory location in the frame buffer is determined for each connection.

3. A frame relay circuit for reassembling a frame-relay frame into an Asynchronous Transfer Mode (ATM) cell comprising:
a processor for determining for each connection a size of a shift by which said frame is to be shifted from a top of the next available memory location in a frame buffer;
a frame receiver for receiving said frame through said connection;
a memory for storing said received frame at a location shifted from the top of the next available memory location in the frame buffer by said shift size; and
a segmentation and reassembling device for reassembling said frame into said ATM cell.

4. A frame relay circuit according to claim 3, wherein, for each connection, said processor writes a data link connection identifier (DLCI) and said shift size into a connection table, and retrieves said shift size from said connection table using said DLCI as a key.

5. A frame relay circuit according to claim 3, wherein said frame received by said frame receiver is transmitted to said memory through direct memory access.

6. A method for reassembling a frame-relay frame into an Asynchronous Transfer Mode (ATM) cell comprising the steps of:
determining a shift size for each connection by which said frame is to be shifted from a top of the next available memory location in a frame buffer;
receiving said frame and writing said frame starting from an address shifted by said shift size; and
reassembling said frame into an ATM cell.

7. A method according to claim 6, further comprising the steps of:
writing a data link connection identifier (DLCI) and said shift size into a connection table for each connection; and
retrieving said shift size from said connection table using said DLCI as a key.

8. A method according to claim 6, wherein said received frame is transmitted to said memory through direct memory access.

9. A computer readable medium containing program instructions for reassembling a frame-relay frame into an Asynchronous Transfer Mode (ATM) cell, the program instructions including instructions for performing the steps comprising:
- determining a shift size for each connection by which said frame is to be shifted from a top address of the next available memory location in a frame buffer;
- receiving said frame and writing said frame starting from an address shifted by said shift size; and
- reassembling said frame into an ATM cell.

10. A computer readable medium according to claim 9, wherein said program instructions include instructions for:
- writing a set of a data link connection identifier (DLCI) and said shift size into a connection table for each connection; and
- retrieving said shift size in said connection table using said DLCI as a key.

11. A computer readable medium according to claim 9, wherein said received frame is transmitted to said memory through direct memory access.

* * * * *